US012250747B2

(12) United States Patent
Nam et al.

(10) Patent No.: US 12,250,747 B2

(45) Date of Patent: Mar. 11, 2025

(54) DOWNLINK/UPLINK (DL/UL) SWITCHING CAPABILITY REPORTING FOR SYSTEMS WITH HIGH SUBCARRIER SPACING (SCS)

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US); Vinay Chande, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/496,656

(22) Filed: Oct. 7, 2021

(65) Prior Publication Data

US 2022/0124863 A1 Apr. 21, 2022

Related U.S. Application Data

(60) Provisional application No. 63/093,093, filed on Oct. 16, 2020.

(51) Int. Cl.

*H04W 76/25* (2018.01)
*H04L 1/00* (2006.01)
*H04L 27/26* (2006.01)

(52) U.S. Cl.

CPC .......... *H04W 76/25* (2018.02); *H04L 1/0015* (2013.01); *H04L 27/26025* (2021.01)

(58) Field of Classification Search

CPC . H04W 76/25; H04L 27/26025; H04L 1/0015
See application file for complete search history.

(56) References Cited

U.S. PATENT DOCUMENTS

2017/0111160 A1* 4/2017 Chen .................... H04W 72/23
2019/0174494 A1* 6/2019 Xu .................... H04W 72/0446

(Continued)

FOREIGN PATENT DOCUMENTS

WO WO-2018201338 A1 * 11/2018 ............ H04L 27/26
WO WO-2020162804 A1 * 8/2020 ........... H04W 16/14

OTHER PUBLICATIONS

International Search Report and Written Opinion—PCT/US2021/054252—ISA/EPO—Jan. 27, 2022.

(Continued)

*Primary Examiner* — Basil Ma

(74) *Attorney, Agent, or Firm* — Seyfarth Shaw LLP

(57) ABSTRACT

A method for wireless communication by a user equipment (UE) determines a downlink/uplink (DL/UL) switching capability of the UE, and reports the DL/UL switching capability to a network. The DL/UL switching capability may indicate a quantity of DL/UL switch points, N, supported by the UE, and a time duration to which the quantity of DL/UL switch points is applied. The DL/UL switching capability may indicate a minimum link duration for which the UE should maintain a link direction after a previous DL/UL switch operation and before a next DL/UL switch operation. The DL/UL switching capability may include a DL/UL switching delay indicating a time specified for the UE to complete a DL/UL switching operation. The DL/UL switching capability may be based on a reference subcarrier spacing (SCS).

27 Claims, 9 Drawing Sheets

(56) References Cited

U.S. PATENT DOCUMENTS

2020/0128526 A1* 4/2020 Yang ..................... H04W 72/51
2020/0162144 A1 5/2020 Zhou et al.
2020/0213035 A1* 7/2020 Wang .................... H04L 5/0053
2022/0060277 A1* 2/2022 Wei ........................ H04L 1/0007
2022/0167407 A1* 5/2022 Oviedo ............. H04W 74/0808
2022/0183053 A1* 6/2022 Li ....................... H04W 74/006
2022/0183064 A1* 6/2022 Talarico ............ H04W 74/0816
2022/0224444 A1* 7/2022 Go ......................... H04L 1/1642
2024/0089959 A1* 3/2024 Ma ...................... H04W 72/232

OTHER PUBLICATIONS

Qualcomm Incorporated: "Clarifications NR Time Ambiguity", 3GPP RAN1 #98, R1-1909237 Clarifications NR Time Ambiguity, 3rd Generation Partnership Project (3GPP), Prague, CZ, Aug. 26-30, 2019, 14 Pages, Retrieved from the Internet: URL: http://www.3gpp.org/ftp/tsg_ran/WG1_RL1/TSGR1_98/Docs/R1-1909237.zip [retrieved on Aug. 17, 2019].

Qualcomm Incorporated: "NR Using Existing DL/UL NR Waveform to Support Operation Between 52.6 GHZ and 71 GHz", 3GPP TSG-RAN WG1 #101-e, R1-2004500, 3rd Generation Partnership Project (3GPP), e-Meeting, May 25-Jun. 26, 2020, 16 Pages, Retrieved from the Internet: URL: https://ftp.3gpp.org/tsg_ran/WG1_RL1/TSGR1_101-e/Docs/R1-2004500.zip R1-2004500_8.1.1_NR using existing DLUL NR waveform.docx [Retrieved on May 16, 2020].

* cited by examiner

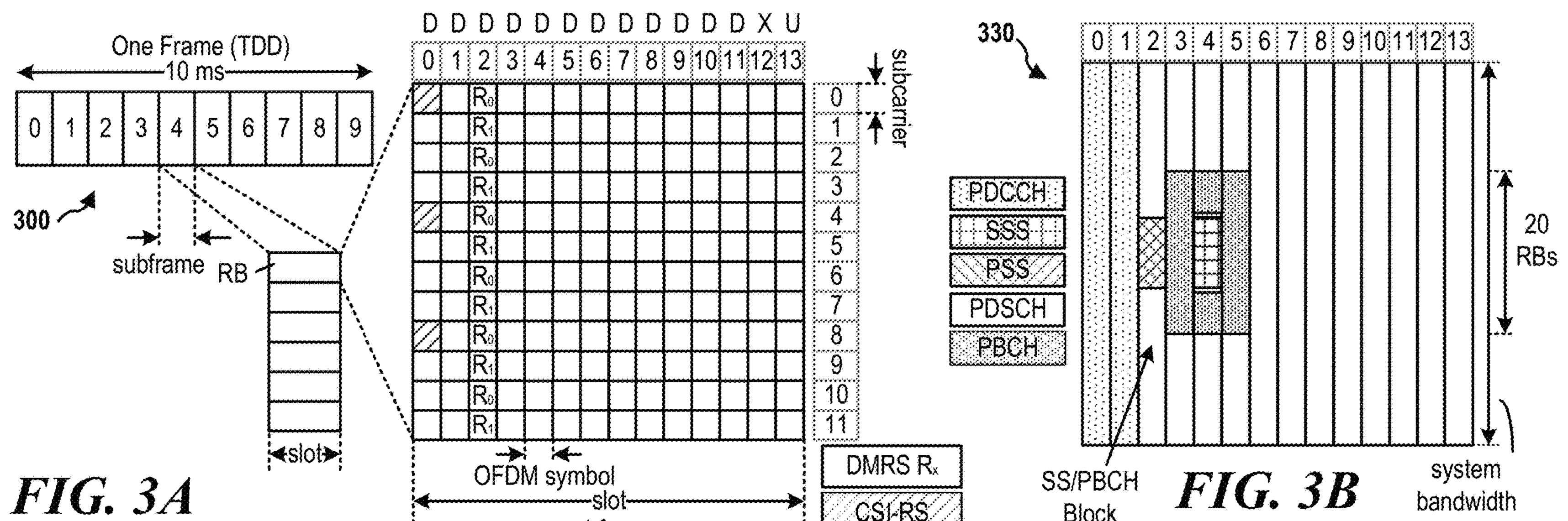
FIG. 3A
FIG. 3B
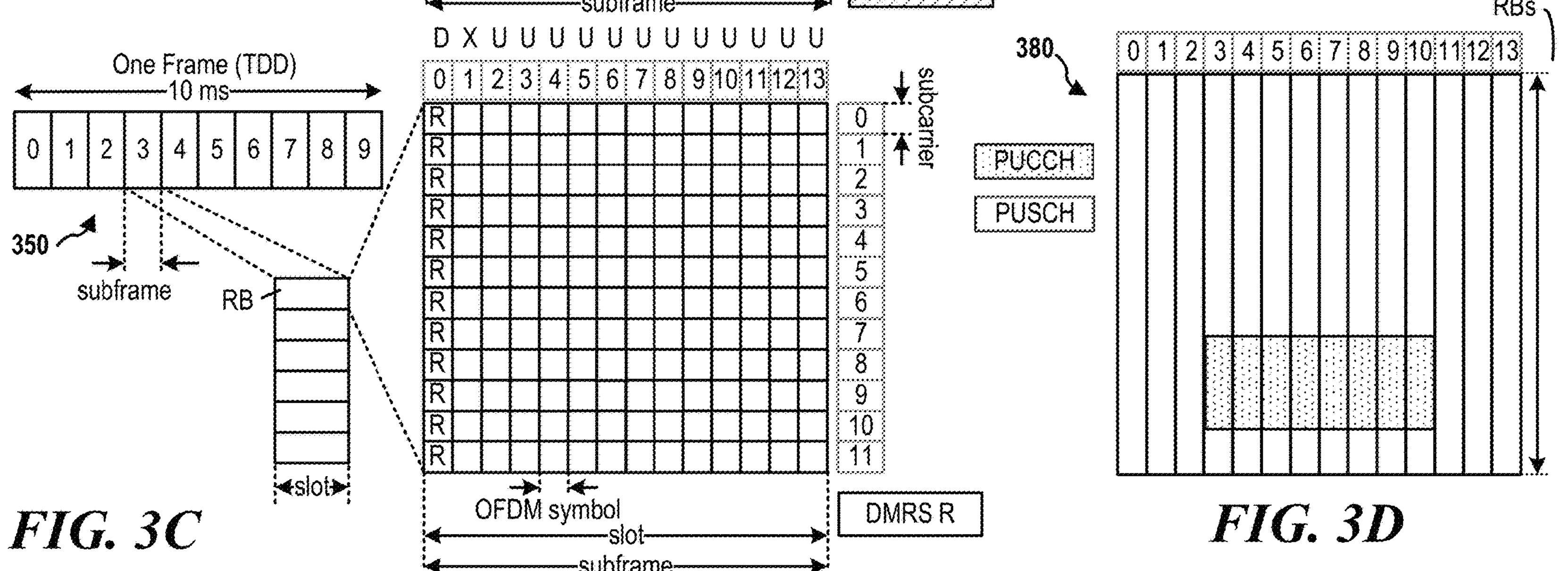
FIG. 3C
FIG. 3D

DOWNLINK/UPLINK (DL/UL) SWITCHING CAPABILITY REPORTING FOR SYSTEMS WITH HIGH SUBCARRIER SPACING (SCS)

CROSS-REFERENCE TO RELATED APPLICATION

The present application claims the benefit of U.S. Provisional Patent Application No. 63/093,093, filed on Oct. 16, 2020, and titled "DOWNLINK/UPLINK (DL/UL) SWITCHING CAPABILITY REPORTING FOR SYSTEMS WITH HIGH SUBCARRIER SPACING," the disclosure of which is expressly incorporated by reference in its entirety.

FIELD OF THE DISCLOSURE

Aspects of the present disclosure generally relate to wireless communications, and more particularly to techniques and apparatuses for reporting a downlink/uplink (DL/UL) switching capability in a wireless communication system having a large subcarrier spacing (SCS).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to aspects of the present disclosure, a method for wireless communication by a user equipment (UE), determines a downlink/uplink (DL/UL) switching capability of the UE. The method also reports the DL/UL switching capability to a network. The DL/UL switching capability indicates a quantity of DL/UL switch points, N, supported by the UE, and a time duration to which the quantity of DL/UL switch points is applied.

In other aspects of the present disclosure, a method of wireless communication by a base station receives from a user equipment (UE), a downlink/uplink (DL/UL) switching capability of the UE, the DL/UL switching capability indicating a quantity of DL/UL switch points, N, supported by the UE, and a time duration to which the quantity of DL/UL switch points is applied. The method also communicates, with the UE, in accordance with the DL/UL switching capability.

In other aspects of the present disclosure, an apparatus for wireless communication by a user equipment (UE) includes a processor and a memory coupled with the processor. The apparatus also includes instructions stored in the memory. When the instructions are executed by the processor, the UE is operable to determine a downlink/uplink (DL/UL) switching capability of the UE. The apparatus can also report the DL/UL switching capability to a network. The DL/UL switching capability indicates a quantity of DL/UL switch points, N, supported by the UE, and a time duration to which the quantity of DL/UL switch points is applied.

An apparatus for wireless communication by a base station includes a processor and a memory coupled with the processor. The apparatus also includes instructions stored in the memory. When the instructions are executed by the processor, the apparatus is operable to receive, from a user equipment (UE), a downlink/uplink (DL/UL) switching capability of the UE. The DL/UL switching capability indicates a quantity of DL/UL switch points, N, supported by the UE, and a time duration to which the quantity of DL/UL switch points is applied. The apparatus can also communicate, with the UE, in accordance with the DL/UL switching capability.

A user equipment (UE) for wireless communication includes means for determining a downlink/uplink (DL/UL) switching capability of the UE. The UE also includes means for reporting the DL/UL switching capability to a network. The DL/UL switching capability indicates a quantity of DL/UL switch points, N, supported by the UE, and a time duration to which the quantity of DL/UL switch points is applied.

A non-transitory computer-readable medium having program code recorded thereon is described. The program code is executed by a processor. The non-transitory computer-readable medium includes program code to determine a downlink/uplink (DL/UL) switching capability of the UE. The UE also includes program code to report the DL/UL switching capability to a network. The DL/UL switching capability indicating a quantity of DL/UL switch points, N, supported by the UE, and a time duration to which the quantity of DL/UL switch points is applied.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIGS. 3A, 3B, 3C, and 3D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

DETAILED DESCRIPTION

Figure 1:
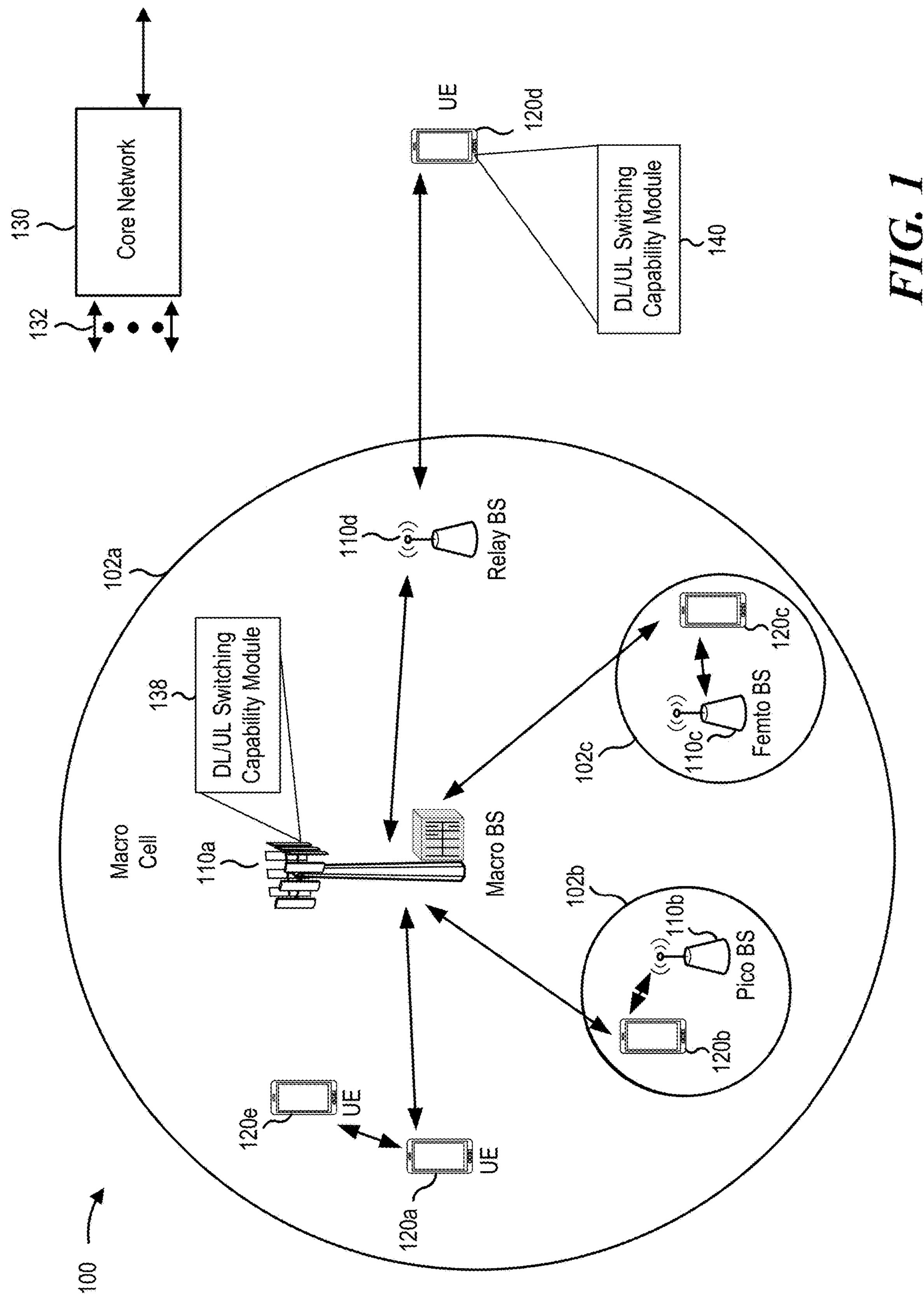
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

There is an interest in wireless communications in higher frequencies. For example, frequency range four (FR4) operating between 52.6 GHz to 114.25 GHz has been considered for new radio (NR) systems. With higher frequencies, phase noise becomes an issue. An orthogonal frequency division multiplexing (OFDM) waveform with a large subcarrier spacing (SCS) (for example, from 240 kHz to 1.92 MHz) may help limit or prevent phase noise when communicating in these higher carrier frequencies. Due to the large subcarrier spacing, the slot length decreases.

A radio frequency (RF) hardware capability is subject to implementation and physical limitations when performing a switching operation between uplink (UL) and downlink (DL) symbols. That is, the RF hardware needs some time to reconfigure itself when switching from transmitting to receiving and vice versa. An issue with the shorter slot length in higher bands with the larger SCS is that the hardware limitations may not scale with the SCS or slot length, thereby preventing fast switching. In higher bands, such as FR4 with a 960 kHz SCS, a larger number of symbols is specified (e.g., sixteen symbols) as a delay for the downlink/uplink switching compared to a lower band, such as FR2 with a 120 kHz SCS, which requires a smaller number of symbols (e.g., two symbols) for switching. Sixteen symbols are longer than a slot duration (e.g., fourteen symbols). Thus, the hardware is unable to finish switching within this time period.

Currently, 3GPP NR Release 15 TS 38.306 and 38.822 specify a DL/UL switching capability for user equipment (UE) as one DL/UL switch point for each slot. For more advanced UEs, 3GPP NR Release 15 TS 38.306 and 38.822 specify a DL/UL switching capability of more than one switch point for each slot. For higher SCSs, the Release 15 definition of DL/UL switching capability may not work. With a single DL/UL switching point for a slot with a higher SCS (e.g., 960 kHz with a 15.6 μs slot length), DL/UL switching may be infeasible. For example, two symbols in a 120 kHz SCS translates to sixteen symbols (larger than an entire slot length) in a 960 kHz system. Without changing the hardware capability, an additional DL/UL switching gap longer than a slot is needed to enable DL/UL switching.

The techniques described provide for enhanced UE capability reporting. The UE may transmit one or more capability parameters using UE capability signaling. The one or more capability parameters may indicate a quantity of DL/UL switch points (N) a UE supports for a number of slots (M) of a transmission time interval for one or more subcarrier spacing, frequency range or frequency band supported by the UE. The new DL/UL switching capability may indicate whether the UE can support either at most one DL/UL switch point or more than one DL/UL switch points for every M-slots, where M≥1. The value of M may be defined for each SCS, frequency band, or frequency range supported by the UE.

In some examples, the capability parameters may explicitly indicate the values of M and N as a pair of values (M, N). In another aspect of the present disclosure, instead of explicitly reporting the values for M and N, these values may be implicitly determined by a reference SCS. A reference SCS may be determined as a part of the new DL/UL switching capability (e.g., jointly reported along with values for M and N) or defined/configured as a separate parameter of one or more capability parameters. For example, the network may configure the reference SCS, the UE may report the reference SCS, or the reference SCS may be part of a standard. The reference SCS may be separate for each SCS, frequency band, or frequency range, or common for all SCSs, frequency bands, or frequency ranges supported by the UE. In other aspects of the present disclosure, values of N and M may be implicitly determined by a reference time duration instead of a reference SCS. In these aspects, the value M is determined by an absolute (e.g., in milliseconds) time duration. Similar to the reference SCS, a reference time duration may be determined as a part of the DL/UL switching capability (e.g., jointly reported), or defined/configured as a separate parameter of the one or more capability parameters. The reference time duration may be separate for each SCS, frequency band, or frequency range, or common for all SCSs, frequency bands, or frequency ranges supported by the UE.

In other aspects of the present disclosure, the new DL/UL switching capability may include a minimum link duration, a DL/UL switching delay parameter, and/or a minimum distance to restrict too frequent DL/UL switching. For example, to account for the shorter slot/transmission durations in higher subcarrier spacing configurations, the UE may report a minimum link duration. The minimum link duration may correspond to a minimum time duration (e.g., number of symbols) that the UE should maintain the link direction (DL or UL) after a switch, and before a next DL/UL switch. In other aspects of the present disclosure, the UE may report the DL/UL switching delay, which corresponds to a time duration that the UE uses or needs to complete a DL/UL switching operation. In still other aspects of the present disclosure, the UE reports a minimum distance, such as a downlink-to-downlink or uplink-to-uplink distance if there is an uplink or downlink symbol in between. For example, after receiving a downlink symbol, the UE determines and reports the earliest subsequent downlink symbol eligible for transmission, if there is an uplink transmission in between. Similarly, after transmitting an uplink symbol, the UE determines and reports the earliest subsequent uplink symbol eligible for transmission, if there is a downlink reception in between.

In some aspects of the present disclosure, the same values may be applied for DL-to-UL and UL-to-DL switching cases. In other aspects, different values may be applied for DL-to-UL and UL-to-DL switching cases. In other aspects of the present disclosure, the minimum link duration, DL/UL switching delay, and minimum distance capabilities may be reported for each SCS, frequency band, or frequency range that the UE supports. The minimum link duration, DL/UL switching delay, and minimum distance capabilities may be defined as a part of the DL/UL switching capability entity (jointly reported) or defined as a separate UE capability (reported separately).

Based on the capability parameters that are transmitted to the base station using the capability signaling, the base station may schedule communications. These capability parameters may include an explicit (M,N) pair, quantity of DL/UL switch points (N) with a reference subcarrier spacing or a reference time duration, minimum link duration, DL/UL switching delay, and/or minimum distance. The communications may be scheduled such that the UE has enough time to perform UL/DL switching between each slot or number of slots. More particularly, the base station may schedule the communications with one or more subcarrier spacing to account for the reported capabilities. These various parameters may be reported using explicit values, using indexes corresponding to lookup tables, or the like.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110*a*, BS 110*b*, BS 110*c*, and BS 110*d*) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a downlink/uplink (DL/UL) switching capability module 140. For brevity, only one UE 120*d* is shown as including the DL/UL switching capability module 140. The DL/UL switching capability module 140 may determine a downlink/uplink (DL/UL) switching capability of the UE, and report the DL/UL switching capability to a network. The DL/UL switching capability indicates a quantity of DL/UL switch points, N, supported by the UE, and a time duration to which the quantity of DL/UL switch points is applied. The DL/UL switching capability module 140 may determine a downlink/uplink (DL/UL) switching capability of the UE, and report the DL/UL switching capability to a network. The DL/UL switching capability includes a minimum link duration for which the UE should maintain a link direction after a previous DL/UL switch operation and before a next DL/UL switch operation. The DL/UL switching capability may also include a DL/UL switching delay indicating a time specified for the UE to complete a DL/UL switching operation.

The base stations 110 may include a downlink/uplink (DL/UL) switching capability module 138. For brevity, only one base station 110*a* is shown as including the DL/UL switching capability module 138. The DL/UL switching capability module 138 may receive, from a UE, a DL/UL switching capability indicating a quantity of DL/UL switch points, N, supported by the UE, and a time duration to which the quantity of DL/UL switch points is applied. The DL/UL switching capability module 138 may also communicate in accordance with the DL/UL switching capability.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
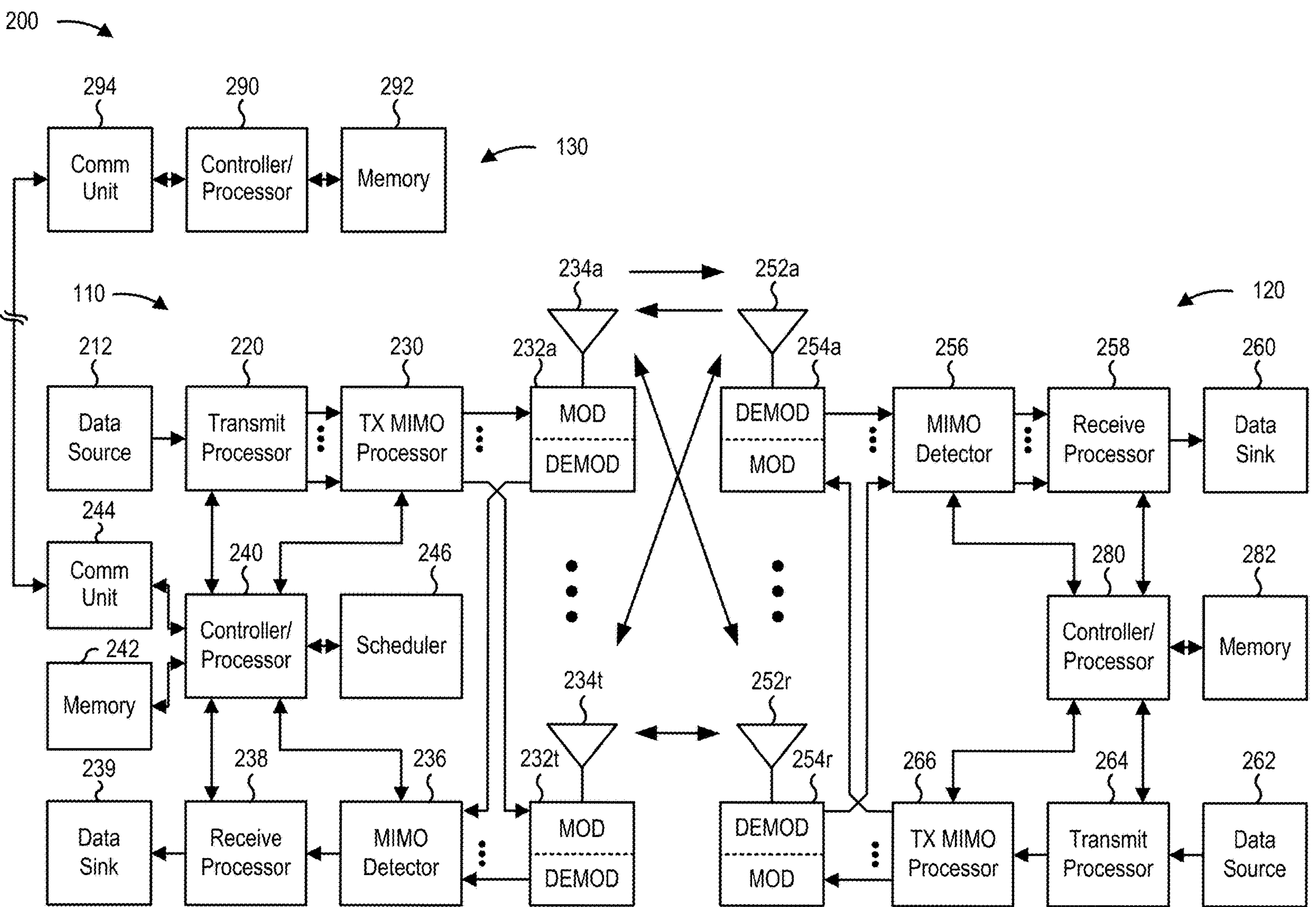
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 280 of the UE 120, the controller/processor 240 of the bases station and/or any other component(s) of FIG. 2 may perform one or more techniques associated with the DL/UL switching capabilities, as described in more detail elsewhere. For example, the controller/processor 280, 240 of the UE 120 or base station 110, and/or any other component(s) of FIG. 2 may perform or direct operations of, for example, the processes of FIGS. 7-9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for determining, means for reporting, means for communicating, means for transmitting, and means for receiving. Such means may include one or more components of the UE 120 and/or base station 110 described in connection with FIG. 2.

As indicated above, FIG. 2 is provided merely as an example. Other examples may differ from what is described with regard to FIG. 2.

FIG. 3A is a diagram 300 illustrating an example of a first subframe within a 5G NR frame structure. FIG. 3B is a diagram 330 illustrating an example of DL channels within a 5G NR subframe. FIG. 3C is a diagram 350 illustrating an example of a second subframe within a 5G NR frame structure. FIG. 3D is a diagram 380 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 3A and 3C, the 5G NR frame structure is assumed to be TDD, with subframe 4 being configured with slot format 28 (with mostly DL), where D is denoted for a DL symbol, U is denoted for an UL symbol, and X is denoted for a flexible symbol for either DL or UL, and subframe 3 being configured with slot format 34 (with mostly UL). While subframes 3, 4 are shown with slot formats 34, 28, respectively, any particular subframe may be configured with any of the various available slot formats 0-61. For example, slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies ($\mu$) 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu$*15 kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 3A-3D provide an example of slot configuration 0 with 14 symbols per slot and numerology $\mu$=0 with 1 slot per subframe. The subcarrier spacing is 15 kHz and symbol duration is approximately 66.7 $\mu$s.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment or negative acknowledgement (ACK/NACK) feedback. The PUSCH carries data, and may additionally be used to carry a buffer status report (BSR), a power headroom report (PHR), and/or UCI.

As described above, there is an interest in wireless communications in higher frequencies. For example, frequency range four (FR4), operating between 52.6 GHz to 114.25 GHz, has been considered for new radio (NR) systems. With higher frequencies, phase noise becomes an issue. An orthogonal frequency division multiplexing (OFDM) waveform with a large subcarrier spacing (SCS) (for example, from 240 kHz to 1.92 MHz) may help limit or prevent phase noise when communicating in these higher carrier frequencies.

The subcarrier spacing may inform an orthogonal frequency multiplexing (OFDM) symbol length as well as a cyclic prefix length that is positioned between adjacent symbols in a transmission duration. More particularly, as subcarrier spacing increases, the OFDM symbol length and the cyclic prefix length may decrease (e.g., the OFDM symbol length and the cyclic prefix length inversely scale with the subcarrier spacing). Due to the large subcarrier spacing, the slot length decreases.

Figure 4:
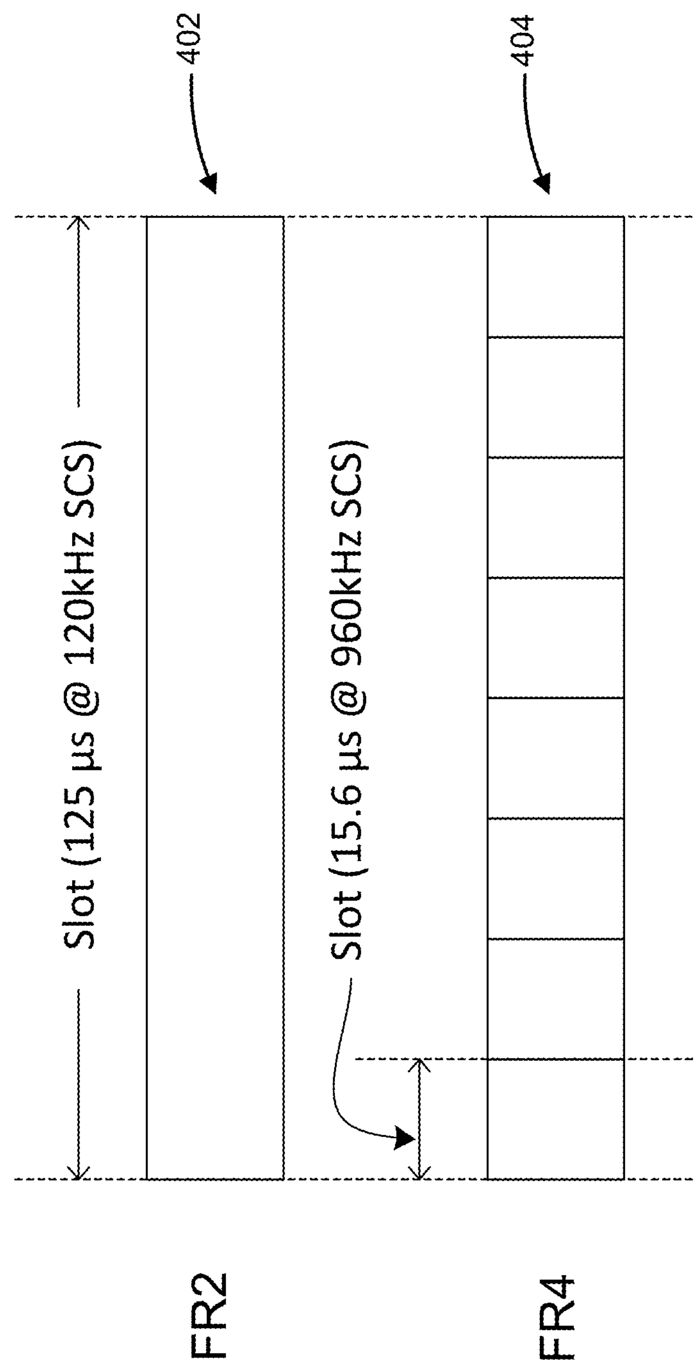
FIG. 4 is a block diagram illustrating various slot lengths.

FIG. 4 is a block diagram illustrating various slot lengths. In a frequency range 2 (FR2) system 402 with a 120 kHz SCS, the slot length is 125 μs. In frequency range 4 (FR4) system 404 with a 960 kHz SCS, the slot length is 15.6 μs. A radio frequency (RF) hardware capability is subject to implementation and physical limitations when performing a switching operation between uplink (UL) and downlink (DL) symbols. An issue with a shorter slot length is that the hardware limitations may not scale with the SCS or slot length, thereby preventing fast switching.

An example of the effect of communicating in higher frequencies can be understood with respect to the FR2 system 402 with a 120 kHz SCS. For this frequency range (e.g., FR2), a time division duplex (TDD) link direction change by the RF hardware from downlink to uplink (DL/UL) or vice versa (UL/DL) may be accomplished within two symbols.

Figure 5:
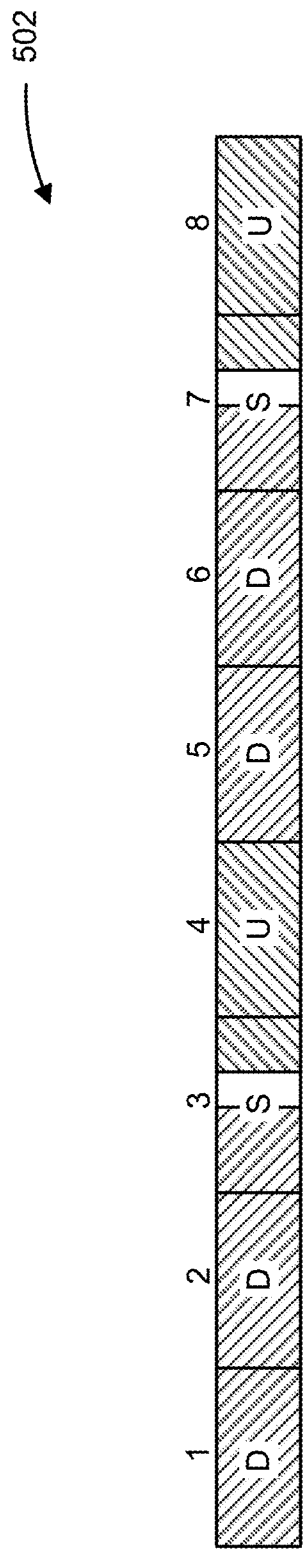
FIG. 5 is a block diagram illustrating a time division duplexed (TDD) subframe including switching periods.

FIG. 5 is a block diagram illustrating a TDD subframe 502 including switching periods. In the example of FIG. 5, eight slots are shown, including four downlink slots ('D'), two uplink slots ('U'), and two special slots ('S'). The special slots, S, each include uplink symbols, downlink symbols, and a gap period between the uplink symbols and downlink symbols. A UE is able to perform a switch from downlink operation to uplink operation during the gap period, which may be more than two symbols.

In higher bands, such as FR4 with a 960 kHz SCS, a larger number of symbols is specified (e.g., sixteen symbols) as a delay for the downlink/uplink switching compared to a lower band, such as FR2 with a 120 kHz SCS, which requires a smaller number of symbols (e.g., two symbols) for switching. Sixteen symbols are longer than a slot duration (e.g., fourteen symbols). Moreover, frequent DL/UL switching may result in increased overhead at a higher SCS.

Currently, 3GPP NR Release 15 TS 38.306 and 38.822 specify a DL/UL switching capability for user equipment (UE) as one DL/UL switch point for each slot. For more advanced UEs, 3GPP NR Release 15 TS 38.306 and 38.822 specify a DL/UL switching capability of more than one switch point for each slot. For higher SCSs, the Release 15 definition of DL/UL switching capability may not work. With a single DL/UL switching point for a slot with a higher SCS (e.g., 960 kHz with a 15.6 μs slot length), DL/UL switching may not be feasible. For example, two symbols in a 120 kHz SCS translates to sixteen symbols (which is larger than an entire slot length) in a 960 kHz SCS system. Without changing the hardware capability, an additional DL/UL switching gap longer than a slot is needed to enable DL/UL switching. As can be seen, switching between downlink and uplink communications is technically challenging, especially with large SCSs. Moreover, the switching may not be power efficient, resulting in inefficient resource utilization.

Aspects of the present disclosure provide for enhanced UE capability reporting. The UE may transmit one or more capability parameters with UE capability signaling. The one or more capability parameters may indicate a quantity of DL/UL switch points (N) a UE supports for a number of slots (M) of a transmission time interval for one or more subcarrier spacing, frequency range, or frequency band supported by the UE. The new DL/UL switching capability may indicate whether the UE can support either at most one DL/UL switch point or more than one DL/UL switch points for each M-slots, where M≥1. The value of M may be defined for each SCS, frequency band, or frequency range supported by the UE. In an aspect, the value of M may be defined for a number of consecutive slots. In some aspects of the present disclosure, the new DL/UL switching capability may be implemented at least for new SCSs (e.g., 960 kHz or higher) that are not currently supported in NR. The new DL/UL switching capability may also support other SCSs, for example, 120 kHz, 240 kHz, and 480 kHz.

In some examples, the capability parameters may explicitly indicate the values of M and N as a pair of values (M,N). For example, the UE may report a value such as (8,1) as a capability. For example, with a 960 kHz SCS, (M,N)=(8,1) maintains the same hardware specifications as legacy systems where the UE supports at most one DL/UL switch capability (e.g., (M,N)=(1,1) with a 120 kHz SCS. It should be understood that other values for M and N are contemplated for various subcarrier spacings. The UE may report the capability pair (M,N) for each subcarrier spacing supported by the UE. In some cases, the capability signaling may use radio resource control (RRC) signaling.

In other aspects of the present disclosure, instead of explicitly reporting the values for M and N, these values may be implicitly determined by a reference SCS. A reference SCS may be determined as a part of the new DL/UL switching capability (e.g., jointly reported along with values for M and N) or defined/configured as a separate parameter of one or more capability parameters. For example, the network may configure the reference SCS, the UE may report the reference SCS, or the reference SCS may be part of a standard.

The reference SCS may be separate for each SCS, frequency band, or frequency range, or common for all SCSs, frequency bands, or frequency ranges supported by the UE. For example, if 120 kHz is used as the reference SCS, then the reported values (M,N)=(1,1) translates to (8,1) for a 960 kHz SCS, because one slot in the reference SCS (for example, 120 kHz) amounts to eight slots in the reported SCS (for example, 960 kHz). Thus, the UE may report a value N, without explicitly reporting M. Rather, the value M may be derived based on the reference SCS, which may be a default value (e.g., configured at the UE by a network or within the standard) or may be reported in the capability parameters. It should be understood that various combinations of reference subcarrier spacings and reported DL/UL switch quantities may be used.

In other aspects of the present disclosure, values of N and M may be implicitly determined by a reference time duration instead of a reference SCS. In these aspects, the value M is determined by an absolute time duration (e.g., in milliseconds). For example, if 0.125 ms is the reference time duration, then the reported values (M,N)=(1,1) translates as (8,1) for a 960 kHz SCS because 0.125 ms amounts to eight slots in the reported 960 kHz SCS.

Similar to the reference SCS, a reference time duration may be determined as a part of the DL/UL switching capability (e.g., jointly reported), or defined/configured as a separate parameter of the one or more capability parameters. The reference time duration may be separate for each SCS, frequency band, or frequency range, or common for all SCS, frequency bands, or frequency ranges supported by the UE. Thus, the UE may report a value N, without explicitly reporting M. Rather, M may be derived based on the reference time duration, which may be a default value (e.g., configured at the UE) or may be reported in the capability parameters. It should be understood that various combinations of reference time durations and reported DL/UL switch quantities may be used.

In other aspects of the present disclosure, the new DL/UL switching capability may include a minimum link duration, a DL/UL switching delay parameter, and/or a minimum distance in order to restrict DL/UL switching from becoming too frequent. For example, to account for the shorter slot/transmission durations in higher subcarrier spacing configurations, the UE may report a minimum link duration. The minimum link duration may correspond to a minimum time duration (e.g., number of symbols) that the UE should maintain the link direction (DL or UL) after a switch, and before a next DL/UL switch.

In other aspects of the present disclosure, the UE may report the DL/UL switching delay, which corresponds to a time duration that the UE uses or needs to complete a DL/UL switching operation. For example, if the reported value of the minimum DL/UL switching delay is K symbols for a subcarrier spacing, the UE may not expect to perform another DL/UL switching within K symbols after the previous DL/UL switching.

In still other aspects of the present disclosure, the UE reports a minimum distance, such as a downlink-to-downlink or uplink-to-uplink distance if there is an uplink or downlink symbol in between. For example, after receiving a downlink symbol, the UE determines and reports the earliest subsequent downlink symbol eligible for transmission, if there is an uplink transmission in between. Similarly, after transmitting an uplink symbol, the UE determines and reports the earliest subsequent uplink symbol eligible for transmission, if there is a downlink reception in between.

In some aspects of the present disclosure, the same values may be applied for DL-to-UL and UL-to-DL switching cases. In other aspects, different values may be applied for DL-to-UL and UL-to-DL switching cases. In still other aspects of the present disclosure, the minimum link duration, DL/UL switching delay, and minimum distance capabilities may be reported for each SCS, frequency band, or frequency range that the UE supports. The minimum link duration, DL/UL switching delay, and minimum distance capabilities may be defined as a part of the DL/UL switching capability entity (jointly reported) or defined as a separate UE capability (reported separately).

Based on the capability parameters, the base station may schedule communications. The capability parameters may include an explicit (M,N) pair, quantity of DL/UL switch points (N) with a reference subcarrier spacing or a reference time duration, minimum link duration, DL/UL switching delay, and/or minimum distance that are transmitted to a base station using the capability signaling. The communications may be scheduled such that the UE has enough time to perform UL/DL switching between each slot or number of slots. More particularly, the base station may schedule the communications with one or more subcarrier spacing to account for the reported capabilities. These various parameters may be reported using explicit values, using indexes corresponding to lookup tables, or the like.

Figure 6:
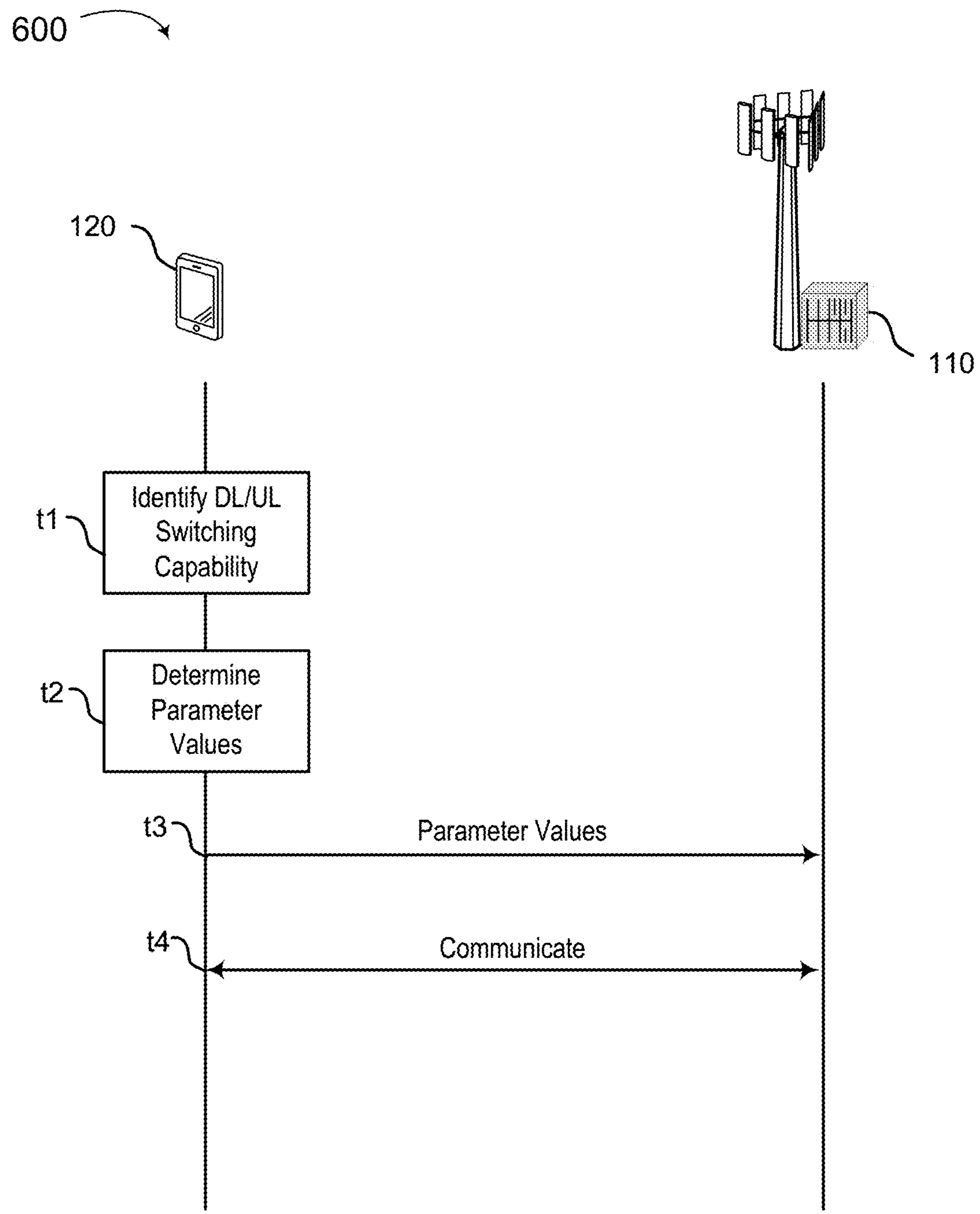
FIG. 6 is a timing diagram illustrating downlink/uplink (DL/UL) switching capability reporting, in accordance with aspects of the present disclosure.

FIG. 6 is a timing diagram 600 illustrating downlink/uplink (DL/UL) switching capability reporting, in accordance with aspects of the present disclosure. In some examples, the timing diagram 600 may implement aspects of the wireless network 100 of FIG. 1. The timing diagram 600 includes a base station 110 and a UE 120 that may be examples of the corresponding devices of FIGS. 1 and 2.

At time t1, the UE 120 may identify a DL/UL switching capability for a subcarrier spacing of a set of subcarrier spacings, frequency range, or frequency band for communications between the UE and a base station. In some examples, the DL/UL switching capability may indicate a quantity of DL/UL switch points for a number of slots of a transmission time interval. In some examples, the DL/UL switching capability may indicate a threshold quantity of symbol periods between DL/UL switching operations associated with the subcarrier spacing, or a DL/UL switching delay or minimum distance, or any combination of the three. The capability may be based on the hardware configuration of the UE 120.

At time t2, the UE 120 may determine, for the identified DL/UL switching capability, one or more parameter values that indicate the identified DL/UL switching capability. In one example, the UE 120 may determine a value (e.g., N) indicating the quantity of DL/UL switch points that the UE 120 is able to perform for a second value (e.g., M) indicating the number of slots.

In another example, the UE 120 may determine a quantity of DL/UL switches, N, and a number of slots, M, relative to a reference subcarrier spacing (SCS). The reference SCS may be separate for each SCS, frequency band, or frequency range, or common for all SCSs, frequency bands, or frequency ranges supported by the UE. For example, if 120 kHz is the reference SCS, then the values (M,N)=(1,1) translates to (8,1) for a 960 kHz SCS, because one slot in the reference SCS (for example, 120 kHz) amounts to eight slots in the reported SCS (for example, 960 kHz). Thus, the UE may determine values of N and M relative to the reference SCS.

In still another example, the UE 120 may determine the quantity of DL/UL switches, N, and a number of slots, M, relative to a reference time duration. For example, if 0.125 ms is the reference time duration, then the reported values (M,N)=(1,1) translate as (8,1) for a 960 kHz SCS because 0.125 ms amounts to eight slots in the reported 960 kHz SCS. Thus, the values of M and N may be determined relative to the reference time duration.

In other examples, the UE 120 may determine a value indicating a threshold quantity of symbol periods between DL/UL switching operations associated with the subcarrier spacing, a DL/UL switching time, a minimum distance, or any combination of the three. For example, the UE 120 may determine that 20 symbols are needed with a 960 kHz SCS between DL/UL switching operations to enable the hardware of the UE 120 to perform processing. Alternatively, or in addition, the UE 120 may determine that an amount of time, e.g., 20 symbols, that the UE 120 should maintain the link direction after a switch and before a next switch. Alternatively, or in addition, the UE 120 may determine the time duration that the UE 120 needs to complete a DL/UL switching operation. The same or different values may be determined for DL/UL switching and UL/DL switching.

At time t3, the UE 120 may transmit with UE capability signaling, the determined one or more parameter values to the base station 110. The UE capability signaling may be RRC signaling (e.g., RRC signaling including a UE capability report). As noted above, the UE 120 may transmit a pair of values (M,N), a value N relative to a reference subcarrier spacing or time duration, or threshold quantity of symbol periods between DL/UL switching operations associated with the subcarrier spacing, a DL/UL switching time for the subcarrier spacing, and/or a minimum distance. In some cases, the reference subcarrier spacing or the reference time duration is reported using the one or more parameters. The parameters may be reported for each subcarrier spacing. At time t4, the UE 120 communicates with the base station 110 according to the identified DL/UL switching capability. The base station 110 may schedule the communications based on the received capability parameters.

As indicated above, FIGS. 3-6 are provided as examples. Other examples may differ from what is described with respect to FIGS. 3-6.

Figure 7:
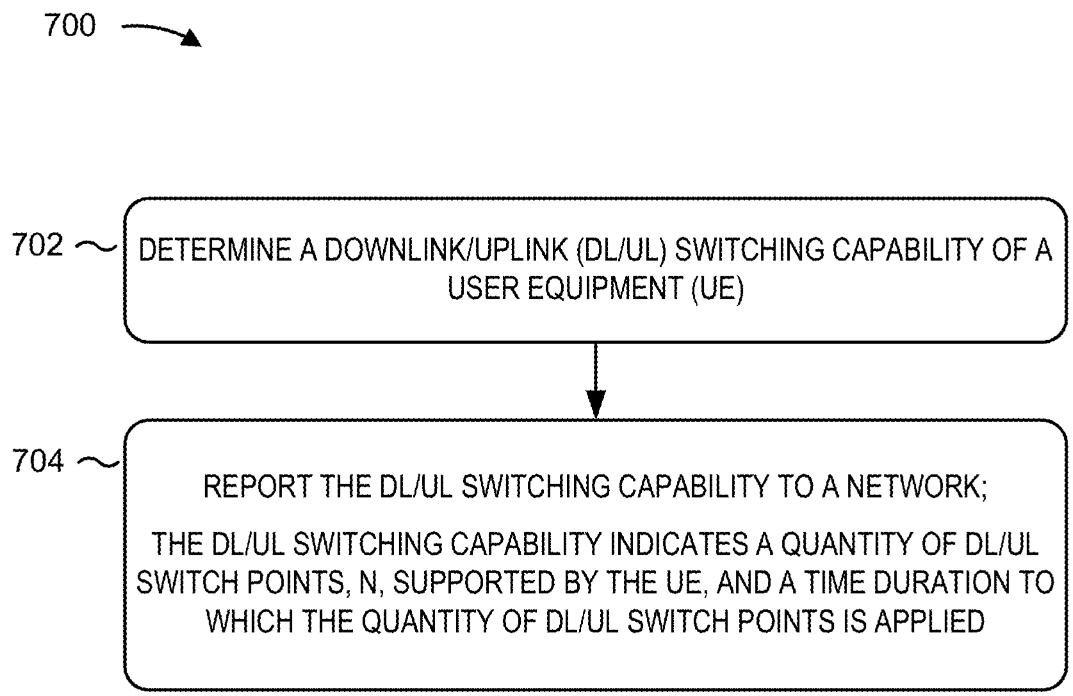
FIG. 7 is a flow diagram illustrating an example reporting process performed, for example, by a user equipment (UE), in accordance with various aspects of the present disclosure.

FIG. 7 is a flow diagram illustrating an example reporting process 700 performed, for example, by a UE (e.g., the UE 120), in accordance with various aspects of the present disclosure. The example process 700 is an example of DL/UL switching capability reporting. At block 702, the UE determines a downlink/uplink (DL/UL) switching capability of the UE, for example, with the memory 282 and controller/processor 280 of FIG. 2. In some aspects, the DL/UL switching capability may be based on a reference subcarrier spacing (SCS) as noted above. The reference SCS may be reported, in some aspects. In other aspects, the UE receives the reference SCS from the network. The DL/UL switching capability may be based on a reference time duration as noted above.

At block 704, the UE reports the DL/UL switching capability to a network, for example, with the antenna 252, modulator 254, Tx MIMO processor 266, transmit processor 264, the memory 282, and/or controller/processor 280 of FIG. 2. The reported DL/UL switching capability indicates a quantity of DL/UL switch points, N, supported by the UE, and a time duration to which the quantity of DL/UL switch points is applied. In some aspects, the time duration comprises a number of consecutive slots, M. The number of slots, M, may be based on a subcarrier spacing, a frequency band or a frequency range supported by the UE. The DL/UL switching capability may correspond to a DL/UL parameter comprising a pair of values including the number of slots, M, and the quantity of DL/UL switch points, N. For example, the UE may explicitly report the parameters of the (M,N) pair, may report the value of N, but not M, or may report the value of M, but not N.

Figure 8:
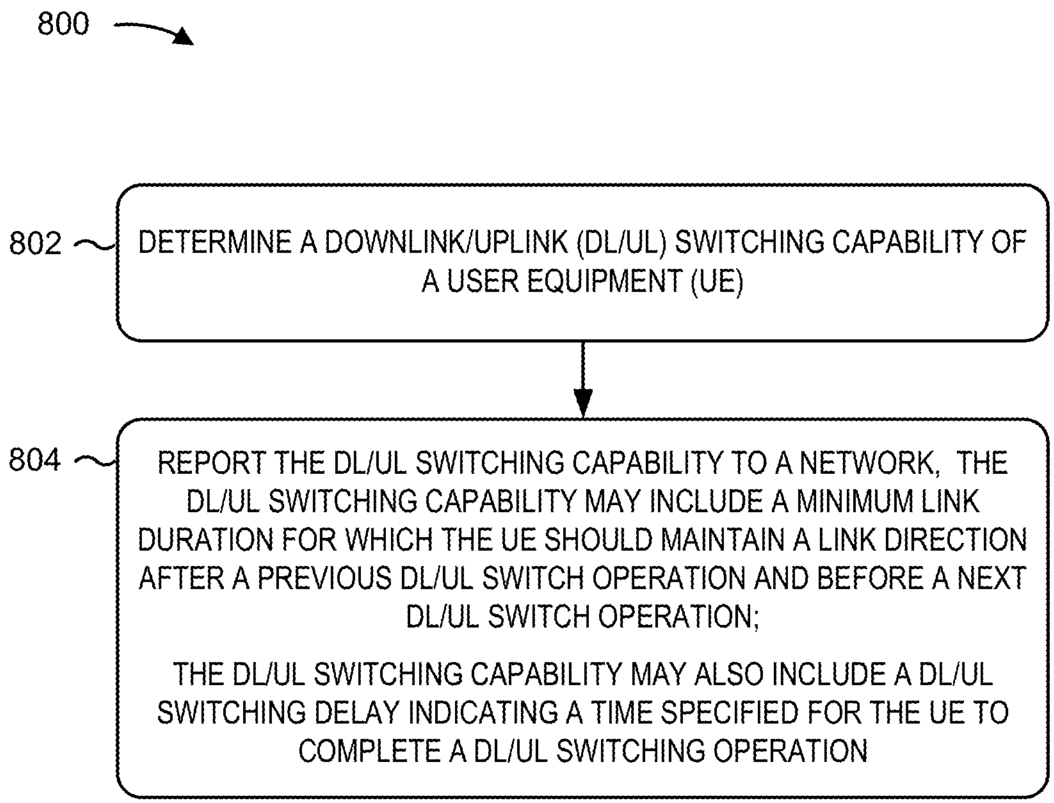
FIG. 8 is a flow diagram illustrating an example reporting process performed, for example, by a user equipment (UE), in accordance with various aspects of the present disclosure.

FIG. 8 is a flow diagram illustrating an example reporting process 800 performed, for example, by a UE (e.g., the UE 120), in accordance with various aspects of the present disclosure. The example process 800 is another example of DL/UL switching capability reporting. At block 802, the UE determines a downlink/uplink (DL/UL) switching capability of the UE, for example, with the memory 282 and controller/processor 280 of FIG. 2. In some aspects, the DL/UL switching delay differs from an UL/DL switching delay. In other aspects, the DL/UL switching delay is the same as an UL/DL switching delay.

At block 804, the UE reports the DL/UL switching capability to a network, for example, with the antenna 252, modulator 254, Tx MIMO processor 266, transmit processor 264, the memory 282, and/or controller/processor 280 of FIG. 2. The DL/UL switching capability may include a minimum link duration for which the UE should maintain a link direction after a previous DL/UL switch operation and before a next DL/UL switch operation. The DL/UL switching capability may also include a DL/UL switching delay indicating a time specified for the UE to complete a DL/UL switching operation. In some aspects, the minimum link duration and/or the DL/UL switching delay is based on a subcarrier spacing (SCS), frequency band or frequency range supported by the UE.

Figure 9:
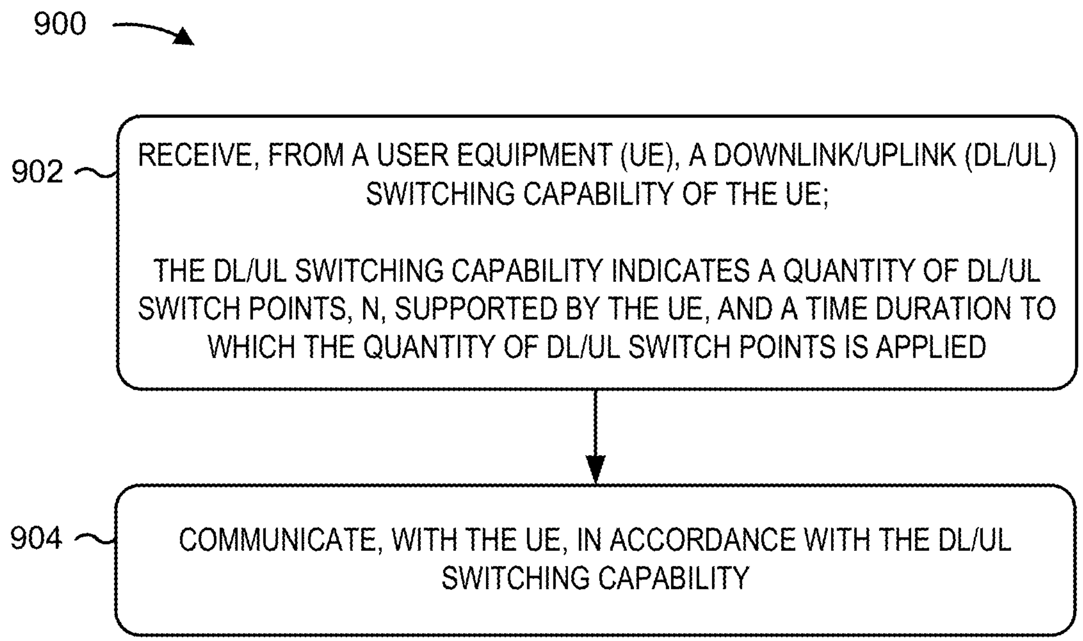
FIG. 9 is a flow diagram illustrating an example process performed, for example, by a base station, in accordance with various aspects of the present disclosure.

FIG. 9 is a flow diagram illustrating an example communication process 900 performed, for example, by a base station (e.g., the base station 110), in accordance with various aspects of the present disclosure. The example process 900 is an example of communicating in accordance with a DL/UL switching capability. At block 902, base station receives, from a UE, a DL/UL switching capability, for example, with the antenna 234, demodulator 232, MIMO detector 236, receive processor 238, the memory 242 and/or controller/processor 240 of FIG. 2. For example, the base station may receive the parameters of the (M,N) pair, may receive the value of N, but not M, or may receive the value of M, but not N. The DL/UL switching capability indicates a quantity of DL/UL switch points, N, supported by the UE, and a time duration to which the quantity of DL/UL switch points is applied. In some aspects, the time duration comprises a number of consecutive slots, M. The number of slots, M, may be based on a subcarrier spacing, a frequency band or a frequency range supported by the UE. The DL/UL switching capability may correspond to a DL/UL parameter comprising a pair of values including the number of slots, M, and the quantity of DL/UL switch points, N.

At block 904, the base station communicates, with the UE, in accordance with the DL/UL switching capability, for example, with the antenna 234, modulator/demodulator 232, MIMO detector 236, receive processor 238, transmit processor 220, Tx MIMO processor 230, memory 242, and/or controller/processor 240 of FIG. 2. For example, the base station may schedule the communications based on the received capability parameters. In some aspects, the DL/UL switching capability may be based on a reference subcarrier spacing (SCS). The reference SCS may be reported by the UE to the base station, in some aspects. In other aspects, the base station transmits the reference SCS to the UE. The DL/UL switching capability may be based on a reference time duration, in some aspects.

Example Aspects

Aspect 1: A method of wireless communication performed by a user equipment (UE), comprising: determining a downlink/uplink (DL/UL) switching capability of the UE; and reporting the DL/UL switching capability to a network, the DL/UL switching capability indicating a quantity of DL/UL switch points, N, supported by the UE, and a time duration to which the quantity of DL/UL switch points is applied.

Aspect 2: The method of Aspect 1, in which the DL/UL switching capability is based on a reference subcarrier spacing (SCS).

Aspect 3: The method of Aspect 1 or 2, in which reporting the DL/UL switching capability includes reporting the reference SCS.

Aspect 4: The method of any of Aspects 1 or 2, further comprising receiving, from the network, a configuration indicating the reference SCS.

Aspect 5: The method of any of the preceding Aspects, in which the reference SCS is 120 kHz.

Aspect 6: The method of any of the preceding Aspects, in which the time duration comprises a number of consecutive slots, M.

Aspect 7: The method of any of the preceding Aspects, in which the number of slots, M, is based on a subcarrier spacing (SCS), a frequency band or a frequency range supported by the UE.

Aspect 8: The method of any of the preceding Aspects, in which the DL/UL switching capability corresponds to a DL/UL parameter comprising a pair of values including the number of slots, M, and the quantity of DL/UL switch points, N.

Aspect 9: The method of any of the preceding Aspects, in which the DL/UL switching capability is based on a reference time duration.

Aspect 10: A method of wireless communication by a base station, comprising: receiving, from a user equipment (UE), a downlink/uplink (DL/UL) switching capability of the UE, the DL/UL switching capability indicating a quantity of DL/UL switch points, N, supported by the UE, and a time duration to which the quantity of DL/UL switch points is applied; and communicating, with the UE, in accordance with the DL/UL switching capability.

Aspect 11: The method of Aspect 10, in which the DL/UL switching capability is based on a reference subcarrier spacing (SCS).

Aspect 12: The method of Aspect 10 or 11, in which receiving the DL/UL switching capability includes receiving the reference SCS.

Aspect 13: The method of any of the Aspects 10-11, further comprising transmitting, to the UE, a configuration indicating the reference SCS.

Aspect 14: The method of any of the Aspects 10-13, in which the reference SCS is 120 kHz.

Aspect 15: The method of any of the Aspects 10-14, in which the time duration comprises a number of consecutive slots, M.

Aspect 16: The method of any of the Aspects 10-15, in which the number of slots, M, is based on a subcarrier spacing (SCS), a frequency band or a frequency range supported by the UE.

Aspect 17: The method of any of the Aspects 10-16, in which the DL/UL switching capability corresponds to a DL/UL parameter comprising a pair of values including the number of slots, M, and the quantity of DL/UL switch points, N.

Aspect 18: The method of any of the Aspects 10-17, in which the DL/UL switching capability is based on a reference time duration.

Aspect 19: An apparatus for wireless communication by a user equipment (UE), comprising: a processor; memory coupled with the processor; and instructions stored in the memory and operable, when executed by the processor, to cause the apparatus: to determine a downlink/uplink (DL/UL) switching capability of the UE; and to report the DL/UL switching capability to a network, the DL/UL switching capability indicating a quantity of DL/UL switch points, N, supported by the UE, and a time duration to which the quantity of DL/UL switch points is applied.

Aspect 20: The apparatus of Aspect 19, in which the DL/UL switching capability is based on a reference subcarrier spacing (SCS).

Aspect 21: The apparatus of Aspect 19 or 20, in which the processor causes the apparatus to report the DL/UL switching capability to include reporting the reference SCS.

Aspect 22: The apparatus of any of the Aspects 19-20, in which the processor causes the apparatus to receive, from the network, a configuration that indicates the reference SCS.

Aspect 23: The apparatus of any of the Aspects 19-22, in which the reference SCS is 120 kHz.

Aspect 24: The apparatus of any of the Aspects 19-23, in which the time duration comprises a number of consecutive slots, M.

Aspect 25: The apparatus of any of the Aspects 19-24, in which the number of slots, M, is based on a subcarrier spacing (SCS), a frequency band or a frequency range supported by the UE.

Aspect 26: The apparatus of any of the Aspects 19-25, in which the DL/UL switching capability corresponds to a DL/UL parameter comprising a pair of values including the number of slots, M, and the quantity of DL/UL switch points, N.

Aspect 27: The apparatus of any of the Aspects 19-26, in which the DL/UL switching capability is based on a reference time duration.

Aspect 28: An apparatus for wireless communication by a base station, comprising: a processor; memory coupled with the processor; and instructions stored in the memory and operable, when executed by the processor, to cause the apparatus: to receive, from a user equipment (UE), a downlink/uplink (DL/UL) switching capability of the UE, the DL/UL switching capability indicating a quantity of DL/UL switch points, N, supported by the UE, and a time duration to which the quantity of DL/UL switch points is applied; and to communicate, with the UE, in accordance with the DL/UL switching capability.

Aspect 29: The apparatus of Aspect 28, in which the DL/UL switching capability is based on a reference subcarrier spacing (SCS).

Aspect 30: The apparatus of Aspect 28 or 29, in which the processor causes the apparatus to receive the DL/UL switching capability by receiving the reference SCS.

Aspect 31: The apparatus of any of the Aspects 28 or 29, in which the processor causes the apparatus to transmit, to the UE, a configuration indicating the reference SCS.

Aspect 32: The apparatus of any of the Aspects 28-31, in which the reference SCS is 120 kHz.

Aspect 33: The apparatus of any of the Aspects 28-32, in which the time duration comprises a number of consecutive slots, M.

Aspect 34: The apparatus of any of the Aspects 28-33, in which the number of slots, M, is based on a subcarrier spacing (SCS), a frequency band or a frequency range supported by the UE.

Aspect 35: The apparatus of any of the Aspects 28-34, in which the DL/UL switching capability corresponds to a DL/UL parameter comprising a pair of values including the number of slots, M, and the quantity of DL/UL switch points, N.

Aspect 36: The apparatus of any of the Aspects 28-35, in which the DL/UL switching capability is based on a reference time duration.

The foregoing disclosure provides illustration and description, but is not intended to be exhaustive or to limit the aspects to the precise form disclosed. Modifications and variations may be made in light of the above disclosure or may be acquired from practice of the aspects.

As used, the term “component” is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

determining a downlink/uplink (DL/UL) switching capability of the UE; and reporting the DL/UL switching capability to a network, the DL/UL switching capability indicating a quantity of DL/UL switch points, N, supported by the UE, and a time duration to which the quantity of DL/UL switch points is applied, the time duration defined per subcarrier spacing (SCS), frequency band or frequency range, and the time duration including a plurality of consecutive time slots.

2. The method of claim 1, in which the DL/UL switching capability is based on a reference subcarrier spacing (SCS).

3. The method of claim 2, in which reporting the DL/UL switching capability includes reporting the reference SCS.

4. The method of claim 2, further comprising receiving, from the network, a configuration indicating the reference SCS.

5. The method of claim 2, in which the reference SCS is 120 kHz.

6. The method of claim 1, in which a quantity of the plurality of consecutive time slots is based on a subcarrier spacing (SCS), a frequency band or a frequency range supported by the UE.

7. The method of claim 1, in which the DL/UL switching capability corresponds to a DL/UL parameter comprising a pair of values including a quantity of the plurality of consecutive time slots and the quantity of DL/UL switch points, N.

8. The method of claim 1, in which the DL/UL switching capability is based on a reference time duration.

9. A method of wireless communication by a base station, comprising:

receiving, from a user equipment (UE), a downlink/uplink (DL/UL) switching capability of the UE, the DL/UL switching capability indicating a quantity of DL/UL switch points, N, supported by the UE, and a time duration to which the quantity of DL/UL switch points is applied, the time duration defined per subcarrier spacing (SCS), frequency band or frequency range, and the time duration including a plurality of consecutive time slots; and communicating, with the UE, in accordance with the DL/UL switching capability.

10. The method of claim 9, in which the DL/UL switching capability is based on a reference subcarrier spacing (SCS).

11. The method of claim 10, further comprising transmitting, to the UE, a configuration indicating the reference SCS.

12. An apparatus for wireless communication by a user equipment (UE), comprising:

one or more processors;

memory coupled with the one or more processors; and instructions stored in the memory and operable, when executed by the one or more processors, to cause the apparatus:

to determine a downlink/uplink (DL/UL) switching capability of the UE; and to report the DL/UL switching capability to a network, the DL/UL switching capability indicating a quantity of DL/UL switch points, N, supported by the UE, and a time duration to which the quantity of DL/UL switch points is applied, the time duration defined per subcarrier spacing (SCS), frequency band or frequency range, and the time duration including a plurality of consecutive time slots.

13. The apparatus of claim 12, in which the DL/UL switching capability is based on a reference subcarrier spacing (SCS).

14. The apparatus of claim 13, in which the one or more processors cause the apparatus to report the DL/UL switching capability to include reporting the reference SCS.

15. The apparatus of claim 13, in which the one or more processors cause the apparatus to receive, from the network, a configuration that indicates the reference SCS.

16. The apparatus of claim 13, in which the reference SCS is 120 kHz.

17. The apparatus of claim 13, in which a quantity of the plurality of consecutive time slots is based on a subcarrier spacing (SCS), a frequency band or a frequency range supported by the UE.

18. The apparatus of claim 13, in which the DL/UL switching capability corresponds to a DL/UL parameter comprising a pair of values including a quantity of the plurality of consecutive time slots and the quantity of DL/UL switch points, N.

19. The apparatus of claim 12, in which the DL/UL switching capability is based on a reference time duration.

20. An apparatus for wireless communication by a base station, comprising:

one or more processors;

memory coupled with the one or more processors; and instructions stored in the memory and operable, when executed by the one or more processors, to cause the apparatus:

to receive, from a user equipment (UE), a downlink/uplink (DL/UL) switching capability of the UE, the DL/UL switching capability indicating a quantity of DL/UL switch points, N, supported by the UE, and a time duration to which the quantity of DL/UL switch points is applied, the time duration defined per subcarrier spacing (SCS), frequency band or frequency range, and the time duration including a plurality of consecutive time slots; and to communicate, with the UE, in accordance with the DL/UL switching capability.

21. The apparatus of claim 20, in which the DL/UL switching capability is based on a reference subcarrier spacing (SCS).

22. The apparatus of claim 21, in which the one or more processors cause the apparatus to receive the DL/UL switching capability by receiving the reference SCS.

23. The apparatus of claim 21, in which the one or more processors cause the apparatus to transmit, to the UE, a configuration indicating the reference SCS.

24. The apparatus of claim 21, in which the reference SCS is 120 kHz.

25. The apparatus of claim 20, in which a quantity of the plurality of consecutive time slots is based on a subcarrier spacing (SCS), a frequency band or a frequency range supported by the UE.

26. The apparatus of claim 20, in which the DL/UL switching capability corresponds to a DL/UL parameter comprising a pair of values including a quantity of the plurality of consecutive time slots.

27. The apparatus of claim 20, in which the DL/UL switching capability is based on a reference time duration.

* * * * *